US012277220B2

(12) United States Patent
Veshchikov et al.

(10) Patent No.: US 12,277,220 B2
(45) Date of Patent: Apr. 15, 2025

(54) METHOD AND DEVICE FOR DETECTING A PROFILING ATTACK

(71) Applicant: NXP B.V., Eindhoven (NL)

(72) Inventors: Nikita Veshchikov, Brussels (BE); Jack Connor, Biggar (GB)

(73) Assignee: NXP B.V., Eindhoven (NL)

( * ) Notice: Subject to any disclaimer, the term of this patent is extended or adjusted under 35 U.S.C. 154(b) by 391 days.

(21) Appl. No.: 17/651,247

(22) Filed: Feb. 16, 2022

(65) Prior Publication Data

US 2023/0259618 A1 Aug. 17, 2023

(51) Int. Cl.
*G06F 21/55* (2013.01)

(52) U.S. Cl.
CPC ...... *G06F 21/556* (2013.01); *G06F 2221/034* (2013.01)

(58) Field of Classification Search
CPC .. G06F 21/556; G06F 2221/034; G06F 21/75; H04L 9/002
See application file for complete search history.

(56) References Cited

U.S. PATENT DOCUMENTS

| | | | |
|---|---|---|---|
| 5,974,507 A | 10/1999 | Arimilli et al. | |
| 7,089,362 B2 | 8/2006 | Creta et al. | |
| 9,436,603 B1 | 9/2016 | Pohlack | |
| 9,443,091 B2 * | 9/2016 | Emmett | G06F 21/602 |
| 9,774,614 B2 | 9/2017 | Patne et al. | |
| 10,521,585 B2 | 12/2019 | Cheng et al. | |
| 10,860,714 B2 | 12/2020 | Browne et al. | |
| 2009/0279687 A1 | 11/2009 | Yoshimoto et al. | |
| 2015/0010146 A1 * | 1/2015 | Matsuda | H04L 9/0816 380/44 |

(Continued)

FOREIGN PATENT DOCUMENTS

| | | |
|---|---|---|
| CN | 109120618 A | 1/2019 |
| CN | 110659499 A | 1/2020 |

(Continued)

OTHER PUBLICATIONS

Hettwer, Benjamin; "Deep Learning-Enhanced Side-Channel Analysis of Cryptographic Implementations;" Dissertation; Thesis submitted: Oct. 29, 2020; Last revision: May 25, 2021.

(Continued)

*Primary Examiner* — Sm A Rahman

(57) ABSTRACT

A method is provided for detecting a profiling attack in an electronic device. The method includes causing provisioning of the device with a key and causing key operations using the key. A total key provisions counter value of a total key provisions counter is updated in response to the key provisioning. Also, a counter value of a total operations counter corresponding to a total number of operations is updated using the detected provisioned keys. A predetermined relationship between the total key provisions counter value and the total operations counter value is detected. An indication of the profiling attack is provided in response to the relationship meeting a predetermined criterion. In another embodiment, an electronic device having a total key provisions counter value and a total key operations counter value is provided. A predetermined relationship between the counter values indicates a profiling attack of the electronic device.

20 Claims, 8 Drawing Sheets

(56) References Cited

U.S. PATENT DOCUMENTS

| | | | |
|---|---|---|---|
| 2017/0163416 A1* | 6/2017 | Hars | H04L 9/0625 |
| 2019/0042739 A1* | 2/2019 | Browne | G06F 21/554 |
| 2019/0130096 A1 | 5/2019 | Chen et al. | |
| 2019/0138719 A1 | 5/2019 | Sultana et al. | |
| 2019/0253439 A1 | 8/2019 | Payton | |
| 2022/0014366 A1 | 1/2022 | Almeida | |

FOREIGN PATENT DOCUMENTS

| | | |
|---|---|---|
| DE | 102019131231 A1 | 6/2020 |
| TW | 201541283 A | 11/2015 |
| WO | 2018088958 A1 | 5/2018 |

OTHER PUBLICATIONS

International Business Machines Corporation; "Method for improving cryptographic ciphers against power-analysis attacks", Research Disclosure, Kenneth Mason Publications, Hampshire, UK, GB, vol. 444, No. 169, Apr. 1, 2001 (Apr. 1, 2001), XP007128067, ISSN: 0374-4353.

Choudary, Omar et al.; "Template Attacks on Different Devices"; International Workshop on Constructive Side-Channel Analysis and Secure Design; Cosade 2014; Lecture Notes in Computer Science, vol. 8622; First online Aug. 15, 2014; DOI:10.1007/978-3-319-10175-0_13.

Zotkin, Yevhenii et al.; "Deep Learning vs Templates Attacks in Front of Fundamental Targets: Experimental Study"; Computer Science; IACR Cryptology; Dec. 20, 2018.

* cited by examiner

METHOD AND DEVICE FOR DETECTING A PROFILING ATTACK

BACKGROUND

Field

This disclosure generally relates to electronic circuits, and more particularly, to a method and device for detecting a profiling attack in an electronic circuit.

Related Art

Modern IT security largely relies on cryptography. One of the main building blocks of cryptography is encryption. The security of encryption algorithms mainly relies on the secrecy of a special value called a key. Given a good encryption scheme it should be impossible to decrypt a secret message without the knowledge of the necessary secret key.

Many attacks on encryption systems try to extract the secret key from the device that is being used to encrypt or decrypt data. One of the strongest types of attacks against cryptographic devices is commonly called a side-channel attack (SCA). Side-channel attacks try to break the implementation of a cryptographic algorithm. In other words, the SCA is used to extract the secret key from a device that encrypts (or decrypts) data. An SCA uses physical properties of devices to extract the secret key. Examples of the physical properties exploited by SCAs include power consumption, sound produced by the device, or time that the device takes to encrypt data.

Profiled SCA attacks are the among the most powerful side-channel attacks. A profiling attack may be thought of as a preparation stage of a profiled SCA. The profiling attack involves the acquisition of side-channel measurements in preparation for a profiled SCA. The attacker uses one device to build a profile, or a model of a device, and the model is used to attack another similar or identical device of the same model and same manufacturer. A profile is a model of the leakage of information from the device. In other words, a profile describes how a given device leaks information about the secret key through a side-channel such as power consumption. The profile is sometimes referred to as a template.

To build a profile, an attacker uses a similar or identical device to the one to be attacked. The device used by the attacker to build the profile is under full or at least partial control of the attacker. That is, the attacker can encrypt any messages using the device and the attacker also knows the secret key that is used in the device. The attacker may also be able to set the secret key to any value. In some cases, the attacker may build the profile privately and thus it is difficult to know that a profile to attack a specific device is being built. The profile may be built using many keys to encrypt many messages within a relatively short period of time. This is different than normal usage, where one key may be used to encrypt many messages.

A lower quality profile will make an attack much less likely to be successful. Also, it may be difficult to transfer knowledge about a profiling trace, from which a profile is built, to an attack trace for a device that is being exploited. In addition, the inherent variability between devices caused by manufacturing variances, or the use of different acquisition campaigns on the same device, may have an adverse impact on the performance of profiling attacks. The profiling attack may be made less effective if the profiling of a device can be detected.

Therefore, what is needed is a device and method for detecting a profiling attack.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
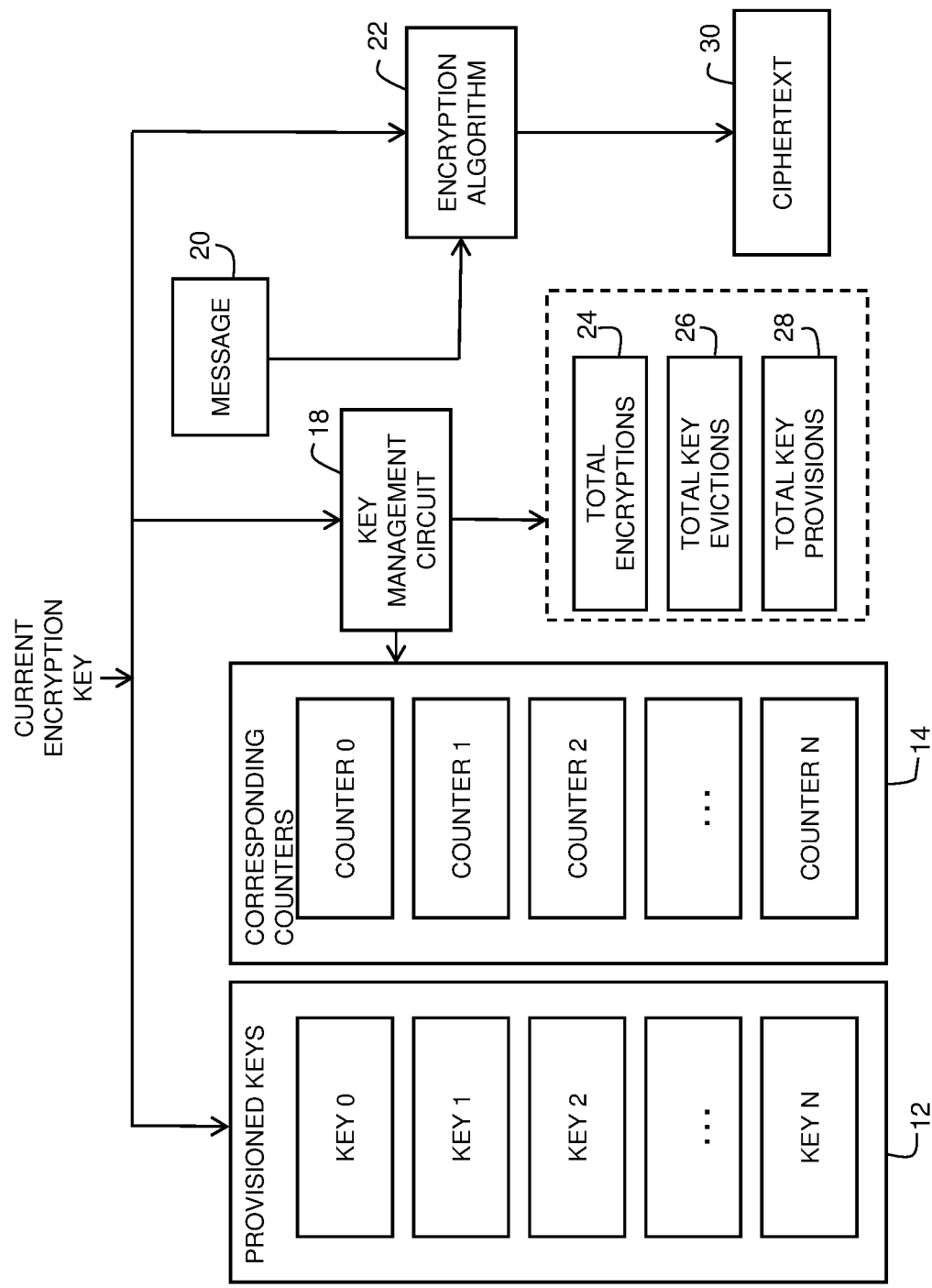
FIG. 1 illustrates a simplified encryption engine in accordance with an embodiment.

Generally, there is provided, a mechanism to detect a profiling attack on an electronic device such as a cellphone or smartcard. For purposes of the described embodiments, a profiling attack is defined as an attack to extract information from a device useful for mounting a profiled side-channel attack (SCA). The profiling attack involves the acquisition of side-channel measurements in preparation for a profiled SCA. The mechanism described herein detects whether the device is being used in an atypical or unintended way that may indicate an adversary is collecting a dataset with the purpose of performing a SCA. The mechanism may include counters for tracking the use of keys and keyed operations. For example, the counters may be used to count key provisioning and operations using the provisioned keys, such as encryptions. If a relationship between the counter values meets a predetermined threshold, then a profiling attack may be occurring, and the device may enable, or activate, one or more countermeasures. That is, the mechanism may be used to raise a flag internal to the device, allowing the device to deploy countermeasures against the profiling attack or SCA. The countermeasures may cause the device to behave in a way that makes the profile being generated by the attacker unusable or of a poorer quality so that it is much more difficult to build a good profile. For example, the countermeasures may prevent a sufficient number of measurements from being taken or prevent accurate measurements by the attacker. This may include restarting the device, or subtly changing a distribution of side-channel measurements.

Encryption is used as an example embodiment, but the same scheme can be used for other cryptographic algorithms that use secret keys. Examples of other operations that use secret keys includes decryption, digital signature computation, computation of message authentication code (MAC), authenticated encryption, etc. Moreover, the described embodiments can be used with symmetric cryptographic algorithms as well as with public-key cryptographic algorithms. Also, even though the tracking of cryptographic keys is described, any secret information processed by an algorithm may also be tracked such as a pin code or a password.

In accordance with an embodiment, there is provided a method for detecting a profiling attack for acquiring side-channel measurements to be used in a profiled side-channel attack on an electronic device, the method including: causing provisioning of the device with a key and causing key operations using the key; updating a total key provisions counter value of a total key provisions counter in response to the key provisioning, and updating a counter value of a total operations counter corresponding to a total number of operations using the detected provisioned keys; detecting a predetermined relationship between the total key provisions counter value and the total operations counter value; and providing an indication of the profiling attack in response to the relationship meeting a predetermined criterion. The method may further include determining if the key has been previously provisioned; in response to determining that the key has not been previously provisioned, a key provisioning counter corresponding to the key and initializing a count value of the key provisioning counter may be enabled to an initial value, and in response to determining that the key has been previously provisioned, incrementing the key provisioning counter corresponding to the key; a pattern between counter values corresponding to previously previsioned keys and counter values of operations is detected using each previously provisioned key; and the indication of the profiling attack is provided in response to detecting the pattern. The operations using the key may be encryption operations. The provisioned keys may be stored in a memory, wherein when a number of stored provisioned keys approaches a maximum storage capacity of the memory, keys are evicted from the memory using a predetermined key eviction strategy. A least recently used key may be evicted when the maximum storage capacity is reached. The provisioned keys may be stored in a memory, and wherein prior to storing, the provisioned keys may be transformed using a predetermined algorithm. The predetermined algorithm may be one of a hashing algorithm or a compression algorithm. Detecting a predetermined relationship between the total key provisions and the total number of operations may include determining a ratio of total key provisions to the total number of operations and comparing the ratio to a threshold. The key may be one of either a cryptographic key, a pin code, or a password.

In accordance with another embodiment, there is provided, a method for detecting a profiling attack for acquiring side-channel measurements to be used in a profiled side-channel attack on an electronic device, the method including: causing provisioning of the device with a key and causing key operations using the key; updating a total key provisions counter in response to the key provisioning, and updating a counter corresponding to a total number of operations using the provisioned keys; determining if the key is a previously provisioned key; in response to determining that the key has not been previously provisioned, enabling a key provisioning counter corresponding to the key and initializing a count value of the key provisioning counter to an initial value, and in response to determining that the key has been previously provisioned, updating the key provisioning counter that corresponds to the provisioned key; detecting a predetermined relationship between the total key provisions and the total number of operations; and providing an indication of the profiling attack in response to the relationship meeting a predetermined criterion. The method may further include: detecting a pattern between counter values corresponding to previously previsioned keys and counter values of operations using each previously provisioned key; and providing the indication of the profiling attack in response to detecting the pattern. The operations using the key may be encryption operations. The provisioned keys may be stored in a memory, wherein when a number of stored provisioned keys approaches a maximum storage capacity of the memory, keys may be evicted from the memory using a predetermined key eviction strategy. A least recently used key may be evicted when the maximum storage capacity is reached. The provisioned keys may be stored in a memory, and wherein prior to storing, the provisioned keys may be transformed using a predetermined algorithm. The predetermined algorithm may be one of a hashing algorithm or a compression algorithm. Detecting a predetermined relationship between the total key provisions and the total number of operations may include determining a ratio of total key provisions to the total number of operations and comparing the ratio to a threshold. The key may be one of either a cryptographic key, a pin code, or a password.

In yet another embodiment, there is provided, an electronic device comprising: a plurality of counters, each counter of the plurality of counters coupled to count usage of one assigned key of a plurality of keys; a total key operations counter coupled to count a total number of operations using the plurality of keys; a total key provisions counter coupled to count a total number of times a key is provisioned into the electronic device; and a key management circuit coupled to the plurality of counters, the total key operations counter, and the total key provisions counter, the key management circuit coupled to control the operations using the plurality of keys, wherein the key management circuit detects a profiling attacking by comparing a predetermined relationship between selected counters of the plurality of counters, the total key operations counter, and the total key provisions counter. The key management circuit may detect a predetermined relationship between a total key provisions counter value and a total key operations counter value and in response to the predetermined relationship meeting a predetermined criterion, providing an indication of a profiling attack.

FIG. 1 illustrates encryption engine 10 in accordance with an embodiment. Encryption engine 10 includes key storage 12, a plurality of counters 14, key management circuit 18, encryption algorithm 22, counter 24 for recording the total number of encryptions, counter 26 for recording the total number of key evictions, and counter 28 for recording the total number of key provisions. Typically, key storage 12 is a form of secure storage, such as a secure element. Key storage 12 may be a plurality of registers, a random-access memory (RAM), a portion of a RAM, etc. Key storage 12 includes a plurality of storage locations labeled KEY 0—KEY N. Plurality of counters 14 includes counters COUNTERS 0—COUNTERS N. Each of the counters corresponds with a stored key in key storage 12. For example, KEY 0 in key storage 12 may be associated with COUNTER 0. Key management circuit 18 controls key provisioning, key storage, and the counters used for key operations. Also, key management circuit 18 provides profiling attack detection in accordance with the disclosed embodiments. Encryption algorithm 22 may receive as inputs a current encryption key and message 20 to be encrypted. Using encryption algorithm 22, message 20 is encrypted with an encryption key labeled "CURRENT ENCRYPTION KEY" to generate cipher text 30. The CURRENT ENCRYPTION KEY may be a new key input into the system or a previously used key retrieved from key storage 12. Encryption algorithm 22 may be any encryption algorithm, such as for example, a symmetric key algorithm such as data encryption standard (DES), an asymmetric key algorithm such as Rivest-Sharmir-Adleman (RSA), or the advanced encryption standard (AES) algorithm. When a new key CURRENT ENCRYPTION KEY is provisioned, the new key is stored in key storage 12. If it is determined that the new key has not been previously provisioned, then the new key is stored in storage 12 and a counter of plurality of counters 14 is selected to correspond with the new key, initialized to an initial counter value such as a "0" or a "1". The selected counter value is updated each time the new key is provisioned. Also, the new key becomes the current key for purposes of operations requiring a key, such as for example, an encryption. If it is determined that the new key has been previously provisioned, the new key has previously been assigned a counter, and the corresponding assigned counter of plurality of counters 14 is used to keep track the use of the key. In one embodiment, the corresponding counter may be incremented or decremented. In another embodiment, a metric may be used, such as a sum, product, polynomial with coefficients, etc. to control the counter. Also, time may be taken into account to track how many key operations are performed. Parts of encryption engine 10, such as for example, key management circuit 18 that tracks previously used keys can be implemented in software, in hardware, as well as in a combination of hardware and software. For additional protection against potential attacks and to improve the speed of the key management circuit 18, a hardware implementation may be more secure than a software implementation. However, a software implementation may give more flexibility and may allow tracking of more previously seen keys. For example, if instead of dedicated registers to store previously seen keys, a larger memory such as e.g., flash may be used. Also, for security reasons, all fields with previously known keys should not be readable by any circuit blocks outside of encryption engine 10. Similarly, the plurality of counters 14 associated with the keys should only be accessible by the encryption engine 10. In addition, all the counters should be stored securely such as in a secure element or trusted execution environment (TEE).

Specific values at which key management circuit 18 triggers an alert may depend on the specific application of the device as well as the security requirements. For example, in one application, if the expression Kch/Enc>0.95 is true, the device might trigger an alert, where Kch is the total number of key changes or provisions and Enc is the total number of encryptions. In another example, if all counters corresponding to known keys are below, e.g., 5 and the number of known keys is high (for example>200), then the key management circuit 18 may trigger an alert. In another example of a profiling attack, the attacker may count how may times a single key was used for encryptions or re-reused after a long time period. These are just three examples, there are other ways the counter values may be used to detect a profiling attack.

For many devices and many use cases, a normal and typical use of an encryption device includes submitting many messages for encryption while the key remains the same for a relatively long period of time. In a profiling attack, to generate a sufficient number of data points to mount an SCA, an attacker may use many keys to encrypt fewer messages per key. These actions may be run in a loop multiple times, and possibility thousands or hundreds of thousands of times. For example, the following actions may be repeated multiple times by an attacker in a profiling attack:

Generate a random key K;
    set up the device to use the random key K;
    generate a random input M (message, cleartext);
    submit the generated input M to the device for encryption;
    while the device encrypts the input, record physical characteristics P of the device (e.g., power consumption); and
    save the values K, M, P in a file or a database.

Also, the output values produced by the device for the given K and M may be saved.

Once the attacker has enough triplets of values K, M, and P, the triplets can be used to build a model using known statistical tools and even machine learning. In accordance with an embodiment, a predetermined relationship between the total key provisions counter value of counter 28 and a total encryptions counter value from counter 24 may be determined. If the relationship is within a predetermined criterion (e.g., above a threshold value), a possible profiling attack has been detected. When detected, an indication, such as an alert, may be generated, and the device may deploy a countermeasure against the attack.

Profiling attacks make operations such as secret transfers (key loading), key scheduling, or poorly exposed encrypted data (secret codes or cryptograms), more vulnerable to side-channel attacks. Such secret transfer operations can be described as 'static targets' because the secret data does not change during the execution of operations. This is opposed to 'dynamic targets' such as the use of a secret key and its transformations while it is mixed with a message during the encryption, which due to varying message data will be different every time. Static targets such as a key during key loading, necessitate a random key profiling set. In other words, the attacker must change the key many times during profiling to target such operations.

Figure 2:
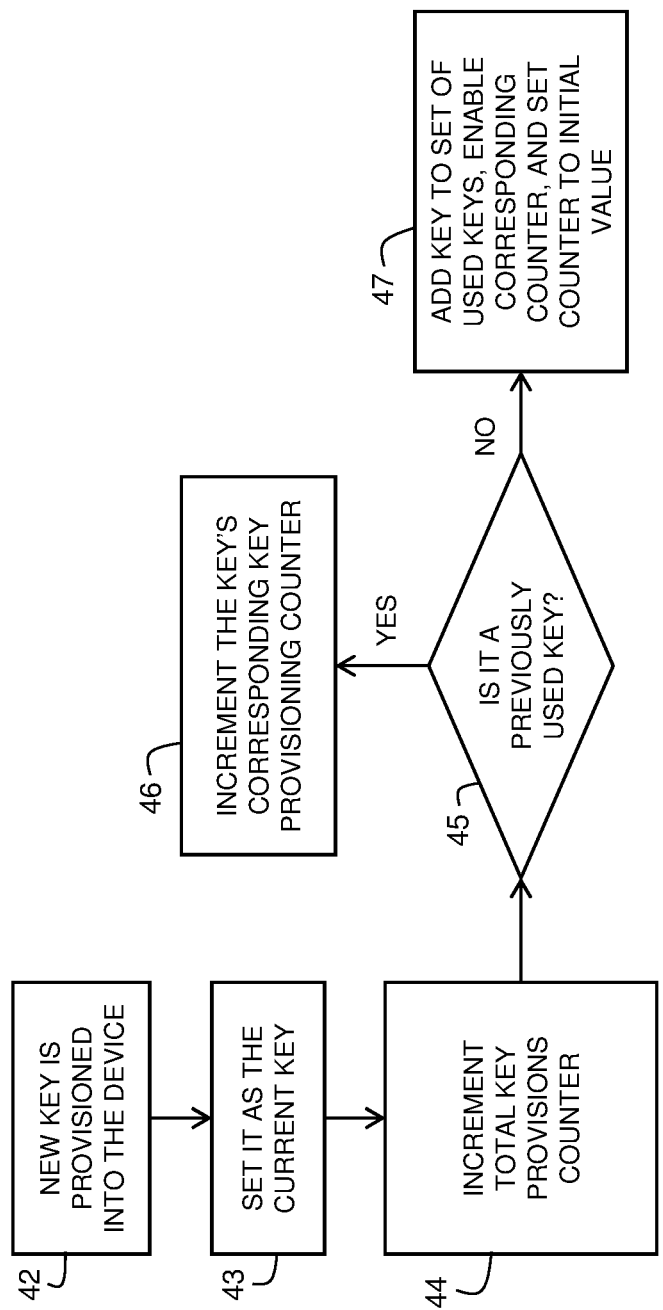
FIG. 2 illustrates a method for provisioning a key into a device in accordance with an embodiment.

FIG. 2 illustrates method 40 for provisioning a key into a device in accordance with an embodiment. When a new key is provided and set into the device, the engine will check if it "already knows" this key i.e., if the key is already in the set of previously provisioned keys stored in key storage 12. If the key has not been previously provisioned into the device, then key management circuit 18 will add the new key to the set of known keys in storage 12, enable a counter to correspond with the new key, and set the corresponding counter to an initial value such as zero. If the key has been previously provisioned, key management circuit 18 will increment the counter corresponding to the previously provisioned key and increment the count value of the corresponding counter of plurality of counters 14. Key management circuit 18 will also increment counter 28 that counts how many times a new key was provisioned into the device. Counter 28 is initially set to an initial value, such as zero, by the manufacturer of the device. Note that the counters may count by incrementing, decrementing, or update using some other metric.

In FIG. 2, method 40 begins at step 42. At step 42, a new key is provisioned into the device. Key provisioning is the process of inserting a new key into a device. There are various ways a new key may be introduced to a device. For example, a device manufacturer may insert a new key into manufactured devices in a secure manufacturing facility. Also, keys may be provisioned remotely by a purchaser of a device using a secure connection to a server. At step 43, the newly provisioned key is set as the current key for use by the device in key operations such as encryption or decryption.

At step 44, total key provisions counter 28 is incremented. At decision step 45, it is determined whether the new key has been previously provisioned into the device. If the new key has been previously used or provisioned into the device, then the YES path is taken to step 46 and the specific counter of plurality of counters 14 is incremented. However, if the new key has not been previously provisioned, the NO path is taken to step 47 and the new key is stored in key storage 12 and a counter of the plurality of counters 14 is enabled, assigned to the key, and set to an initial count value.

Figure 3:
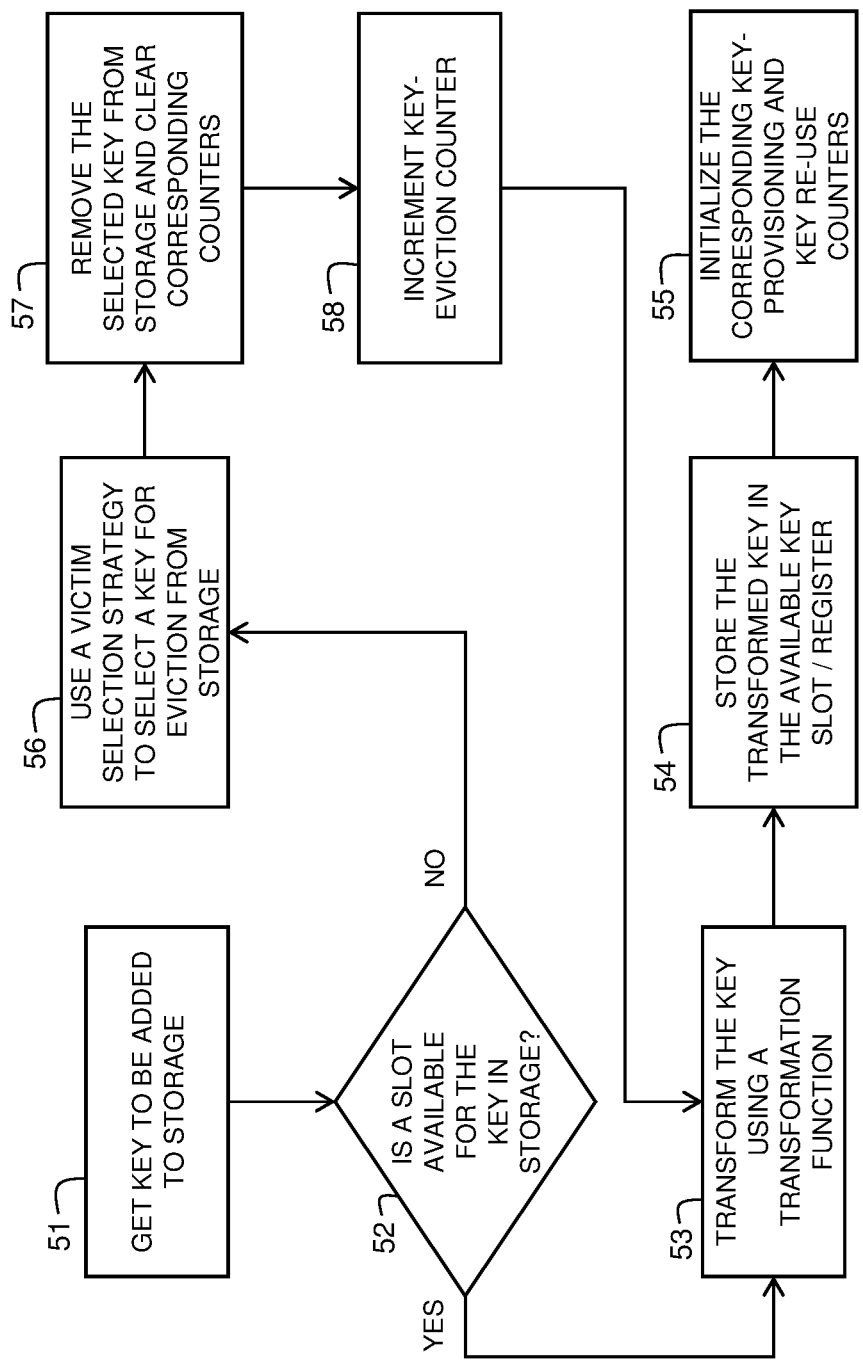
FIG. 3 illustrates a method for adding a key to storage in accordance with an embodiment.

FIG. 3 illustrates method 50 for adding a key to storage 12 in accordance with an embodiment. Method 50 begins at step 51. At step 51, the new key to be added to storage is received. At decision step 52, it is asked if a slot or memory location is available in key storage 12. If a slot is available in key storage 12, the YES path is taken to step 53 where a transformation function may be applied to the key. The key may be transformed before storage because saving an entire encryption key might not be an ideal solution for at least two reasons, security and limited storage space. Regarding security, simply having an encryption key stored somewhere might lead to the encryption key being retrieved by an attacker. Regarding limited storage space, some encryption algorithms require very large keys. For example, up to megabytes of storage space may be necessary for some post-quantum cryptographic algorithms. Thus, it may be better to store some transformed version of a key instead of the key itself. For example, a transformation function such as a hashing algorithm like SHA-3 or a compression algorithm having an encryption scheme with a special dedicated key may be used to create a transformed version of the key. At step 54, the transformed key is stored in an available slot or register of key storage 12. At step 55, a corresponding counter of plurality of counters 14 is initialized or enabled, and a counter value is initialized to an initial count value. Anytime the key is used for a key operation, the corresponding counter is incremented. Referring to decision step 52, if a slot is not available in key storage 12, e.g., because a maximum storage capacity of the memory has been reached, the NO path is taken to step 56. At step 56, a stored key in key storage 12 is chosen to be removed, or evicted, from storage. To select a key for eviction, a victim selection strategy may be used.

The amount of memory and thus number of previously seen keys that the system can track is limited. If the number of key changes exceeds this value, a decision will have to be made about which keys to keep track of and which keys to discard. A key eviction strategy, or process, is how the device knows how to select a key for removal from storage. Multiple strategies can be applied for this purpose. For example, one strategy may discard the least recently used key and keep the newest key, or discard the key that has the lowest counter value associated with it. This mechanism of choosing the key to remove from the set of known keys is called key-eviction. It is also possible to keep track of how many keys were evicted from storage using a dedicated counter, such as counter 26 in FIG. 1. There can be an associated threshold with key eviction. If evicted-key counter 26 exceeds the threshold then the device may trigger an alert. A large number of key evictions may mean that an attacker is performing many key provisionings with new unknown keys very often which may indicate a potential preparation for a SCA.

At step 57, the selected victim key is removed from storage 12 and the corresponding counter of plurality of counters 14 is cleared. At step 58, a key eviction counter, such as key eviction counter 26, is incremented, if available. After step 58, the method proceeds to steps 53-55 as discussed above.

Figure 4:
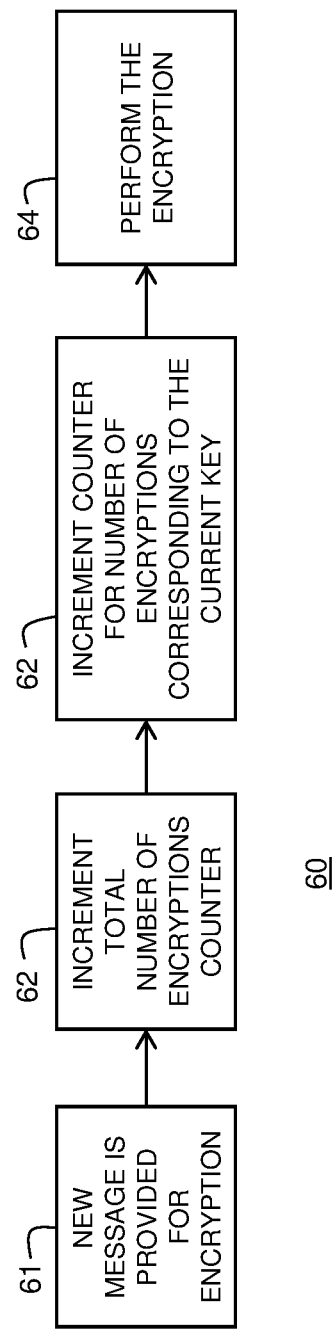
FIG. 4 illustrates a method for encrypting a message in accordance with an embodiment.

FIG. 4 illustrates method 60 for encrypting a message in accordance with an embodiment. Method 60 begins at step 61. At step 61, a message to be encrypted is provided to encryption engine 10. At step 62, key management circuit 18 will increment the counter of plurality of counters 14 that corresponds to the currently used key. Key management circuit 62 will also increment counter 24 that counts how many messages were encrypted in encryption engine 10. At step 64, the encryption is performed using an encryption algorithm.

Figure 5:
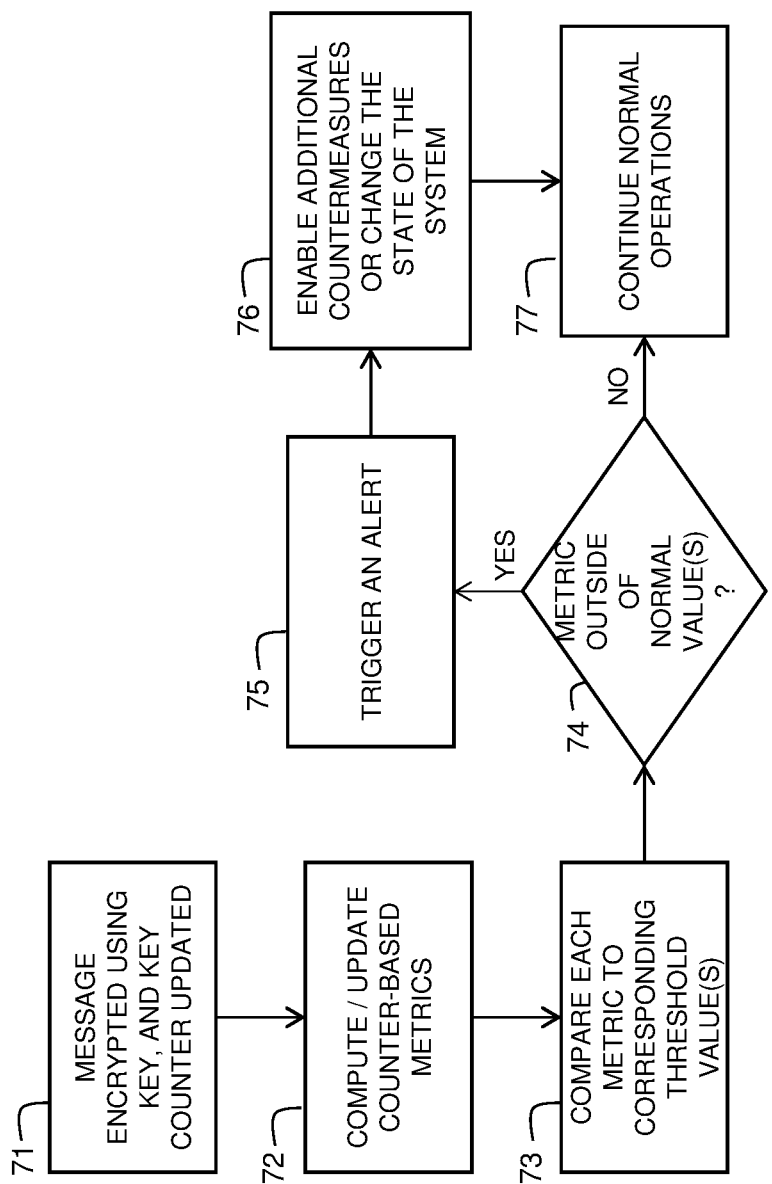
FIG. 5 illustrates a method to detect a profiling attack in accordance with an embodiment.

FIG. 5 illustrates method 70 to detect a profiling attack in accordance with an embodiment. As mentioned above, a profiling attack is the acquisition of side-channel measurements for a profiled SCA. Method 70 begins at step 71. At step 71, a message is encrypted using a key and the corresponding counter is updated. At step 72, counter-based metrics are computed or updated. A metric in this case can be any function, such as for example, sum, product, polynomial with some coefficients, etc. that can be used to update the counters used to track the use of keys and number of encryptions. Such function can also take time into account, e.g., to track how many encryptions per second are performed. In the example given earlier (Kch/Enc>0.95): Kch/Enc is the metric that is used and 0.95 is the upper bound for the metric (threshold that should not be exceeded). Multiple metrics can be computed and used to trigger an alert, e.g., if the majority of these metrics are outside of normal values. Another option would be to trigger an alert if a predetermined number of metrics, e.g., at least 5, are outside of normal (expected) values. At regular intervals the device can examine the values of counters. For example, the values may be examined after each encryption, once every N encryption, or once every K minutes. Depending on relative values of the number of known keys, counter values corresponding to known keys, and the total number of encryptions, encryption engine 10 can alert the device that it is likely being profiled for a future SCA attack.

At step 73, each metric is compared to a corresponding threshold value or values. At decision step 74, it is determined if the metric is outside of normal values. If the metric is not outside normal values, the NO path is taken to step 77, and normal operations continue. If, at step 74, the metric is outside of normal values, the YES path is taken to step 75, and an alert is triggered. Instead of having just one threshold, it is possible to have multiple thresholds. The multiple thresholds may include, e.g., a "weak" indication of an attack being prepared, a "strong" indication, or an "extreme" indication. Alerts of different strengths can be triggered, and thus different countermeasures or reactions can be used by the system. Using the above metric Kch/Enc, as an example, a threshold of 0.7 may indicate a weak alert, the threshold of 0.95 may be a strong alert, and a threshold of 0.99 may be an extreme alert. The device (more specifically, the operating system (OS) or the encryption engine of the device) can decide whether to react to these alerts. As an example, additional countermeasures may be enabled for a weak alert. The device may be reset, and additional security checks implemented for a strong alert. For an extreme alert, the content of the device may be set in a blocked mode that requires interaction with the vendor or manufacturer of the device to be released from the blocked mode.

Once an alert is triggered at step 75, the alert can be reported to other blocks in the device or to the OS if the OS supports it. At step 76, key management circuit 18 may also turn on additional countermeasures against attacks or change or renew protection schemes against profiled attacks. Moreover, some use-case or device specific logic might be implemented to modify operation of encryption engine 10 to maximize a difference between detection of a profiling attack versus a profiled SCA attack. The countermeasures may cause the device to behave in a way that makes the profile unusable or of a poor quality so that it is much more difficult for an attacker to build a good profile. For example, the countermeasures may prevent a sufficient number of measurements from being attained or prevent accurate measurements by the attacker. This may include restarting the device, or subtly changing a distribution of side-channel measurements.

The levels for alerts can be set by the device manufacturer or application developer and should not be resettable afterwards. Many features related to cryptography and security work this way and cannot be changed once the manufacturer or the application developer locked them.

Figure 6:
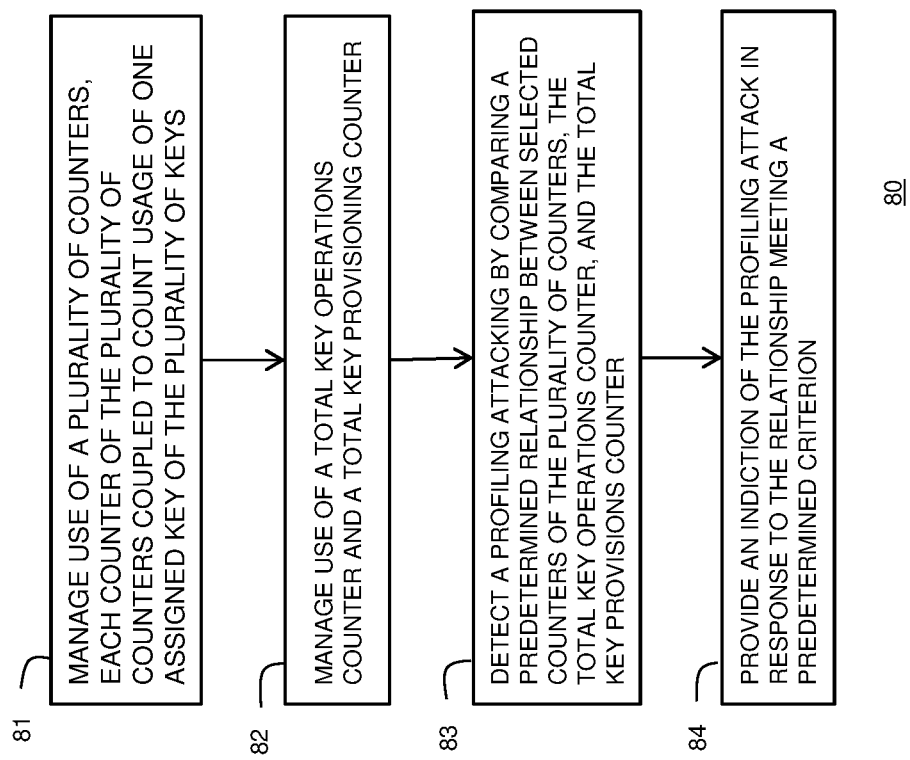
FIG. 6 illustrates a method to detect a profiling attack in accordance with another embodiment.

FIG. 6 illustrates method 80 for detecting a profiling attack in accordance with another embodiment. Method 80 begins at step 81. At step 81, the use of a plurality of counters in a device is managed, where each counter of the plurality of counters is coupled to count usage of one assigned key of the plurality of keys. At step 82, the use of a total key operations counter and a total key provisioning counter are managed. In the illustrated embodiment, the counters are managed by key management circuit 18 of FIG. 1. At step 83, a profiling attack may be detected by comparing a predetermined relationship between selected counters of the plurality of counters and the total key provisions counter. At step 84, an indication of the profiling attack may be provided in response to the relationship meeting a predetermined criterion.

Figure 7:
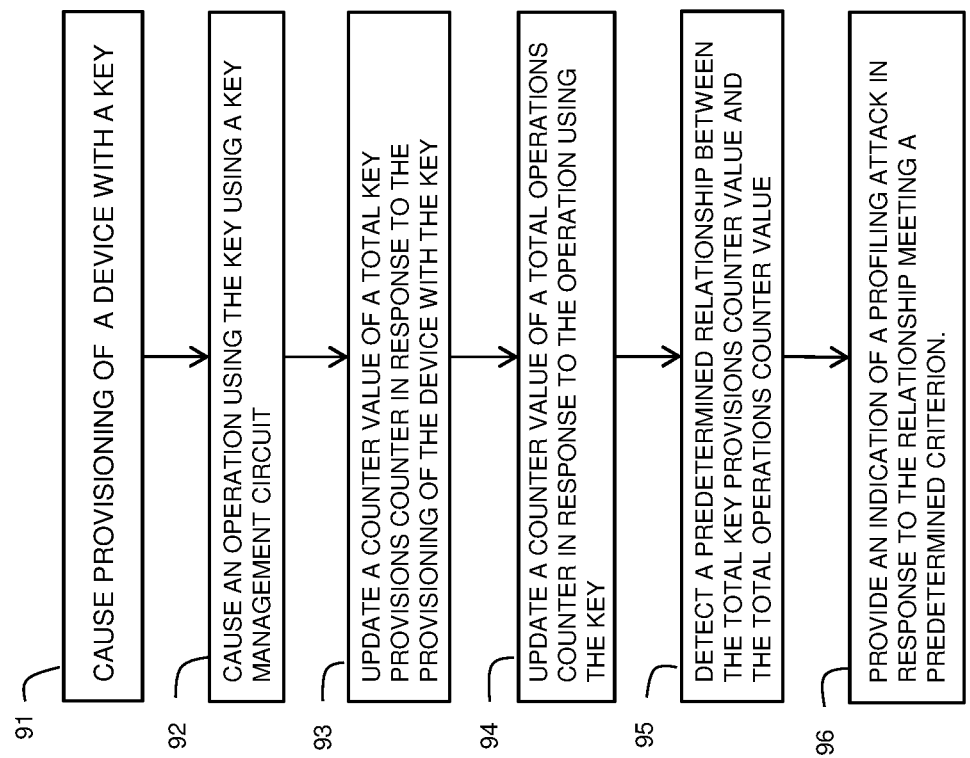
FIG. 7 illustrates a method to detect a profiling attack in accordance with another embodiment.

FIG. 7 illustrates method 90 for detecting a profiling attack in accordance with another embodiment. Method 90 begins at step 91. At step 91, a device is provisioned with a key. At step 92, a key management circuit of the device causes an operation using the key. The operation may be an encryption operation. At step 93, a counter value of a total key provisions counter is set or updated in response to the provisioning of the device with the key. At step 94, a counter value of a total operations counter is set or updated in response to the operation using the key. At step 95, a predetermined relationship between the total key provisioning counter value and the total operations counter value is detected. In one embodiment, the predetermined relationship may be a ratio of the total key provisioning, or key changes, to the total operations counter value. At step 96, an indication of a profiling attack is provided in response to the predetermined relationship meeting a predetermined criterion. The predetermined criterion may be one or more threshold values.

Figure 8:
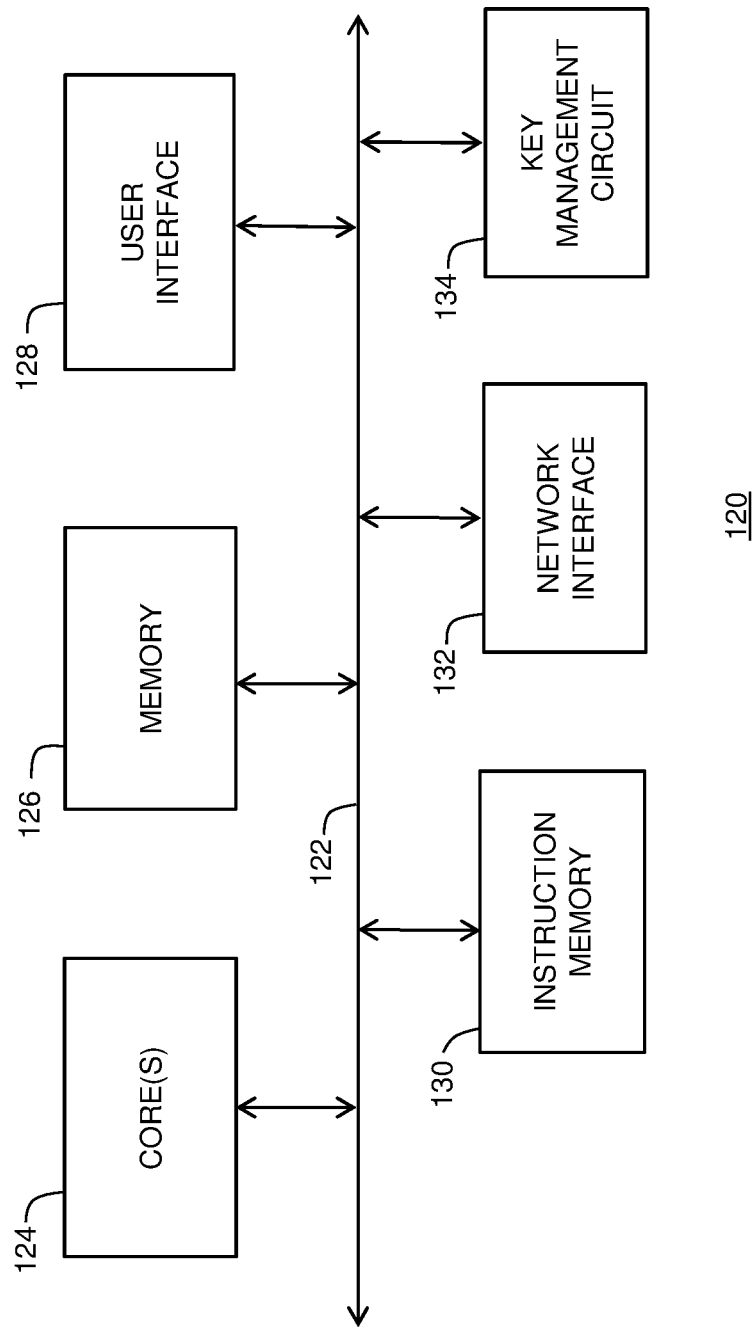
FIG. 8 illustrates a data processing system useful for implementing the methods for watermarking in accordance with an embodiment.

FIG. 8 illustrates data processing system 120 useful for implementing an electronic device, and in particular, encryption engine 10 in accordance with an embodiment. Data processing system 120 may be implemented using one or more integrated circuits and may be used in an implementation of the described embodiments. Data processing system 120 includes bus or switching network 122. Connected to bus 122 is one or more processor cores 124, memory 126, user interface 128, instruction memory 130, network interface 132, and key management circuit 134. The one or more processor cores 124 may include any hardware device capable of executing instructions stored in memory 126 or instruction memory 130. For example, processor cores 124 may execute encryption and/or decryption algorithms in the illustrated embodiment. Processor cores 124 may be, for example, a microprocessor, field programmable gate array (FPGA), application-specific integrated circuit (ASIC), or similar device. Processor cores 124 may be implemented in a secure hardware element and may be tamper resistant.

Memory 126 may be any kind of memory, such as for example, L1, L2, or L3 cache or system memory. Memory 126 may include volatile memory such as static random-access memory (SRAM) or dynamic RAM (DRAM), or may include non-volatile memory such as flash memory, read only memory (ROM), or other volatile or non-volatile memory. Also, memory 126 may be implemented in a secure hardware element or other type of secure storage. Alternately, memory 126 may be a hard drive implemented externally to data processing system 120. In one embodiment, memory 126 may be used to store provisioned keys and the corresponding counter values.

User interface 128 may be connected to one or more devices for enabling communication with a user such as an administrator. For example, user interface 128 may be enabled for coupling to a display, a mouse, a keyboard, or other input/output device. Network interface 132 may include one or more devices for enabling communication with other hardware devices. For example, network interface 132 may include, or be coupled to, a network interface card (NIC) configured to communicate according to the Ethernet protocol. Also, network interface 132 may implement a TCP/IP stack for communication according to the TCP/IP protocols. Data samples for classification may be input via network interface 132, or similar interface. Various other hardware or configurations for communicating are available.

Instruction memory 130 may include one or more non-transient machine-readable storage media for storing instructions for execution by processor cores 124. In other embodiments, both memories 126 and 130 may store data upon which processor cores 124 may operate. Memories 126 and 130 may also store, for example, encryption, decryption, and verification applications. Memories 126 and 130 may be implemented in a secure hardware element and be tamper resistant.

Key management circuit 134 may be implemented in hardware, software, or a combination of hardware and software. Key management circuit 134 controls key provisioning, key storage, and the counters used for key operations in data processing system 120. Also, key management circuit 134 provides profiling attack detection as discussed above. Key management circuit 134 is the same as or similar to key management circuit 18 illustrated in FIG. 1.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for detecting a profiling attack for acquiring side-channel measurements to be used in a profiled side-channel attack on an electronic device, the method comprising:
    causing provisioning of the device with a key and causing key operations using the key;
    incrementing a total key provisions counter value of a total key provisions counter in response to provisioning of the device with the key, and updating a counter value of a total operations counter corresponding to a total number of operations using provisioned keys with which the device has been provisioned;
    detecting a predetermined relationship between the total key provisions counter value and the total operations counter value; and
    providing an indication of the profiling attack in response to the relationship meeting a predetermined criterion;
    wherein the key is a valid key and the total operations counter value corresponds to a number of operations performed by the device using provisioned keys, each of which is a valid key.

2. The method of claim 1, further comprising determining if the key has been previously provisioned;
    in response to determining that the key has not been previously provisioned, enabling a key provisioning counter corresponding to the key and initializing a count value of the key provisioning counter to an initial value, and in response to determining that the key has been previously provisioned, incrementing the key provisioning counter corresponding to the key; and
    detecting a pattern between counter values corresponding to previously previsioned keys and counter values of operations using each previously provisioned key; and
    providing the indication of the profiling attack in response to detecting the pattern.

3. The method of claim 1, wherein the operations using the key are encryption operations.

4. The method of claim 1, wherein the provisioned keys are stored in a memory, wherein when a number of stored provisioned keys approaches a maximum storage capacity of the memory, keys are evicted from the memory using a predetermined key eviction strategy.

5. The method of claim 4, wherein a least recently used key is evicted when the maximum storage capacity is reached.

6. The method of claim 1, wherein the provisioned keys are stored in a memory, and wherein prior to storing, the provisioned keys are transformed using a predetermined algorithm.

7. The method of claim 6, wherein the predetermined algorithm is one of a hashing algorithm or a compression algorithm.

8. The method of claim 1, wherein detecting a predetermined relationship between the total key provisions and the total number of operations comprises determining a ratio of total key provisions to the total number of operations and comparing the ratio to a threshold.

9. The method of claim 1, wherein the key is one of either a cryptographic key, a pin code, or a password.

10. A method for detecting a profiling attack for acquiring side-channel measurements to be used in a profiled side-channel attack on an electronic device, the method comprising:
    causing provisioning of the device with a key and causing key operations using the key;
    updating a total key provisions counter in response to the key provisioning, and updating a counter corresponding to a total number of operations using the provisioned keys;
    determining if the key is a previously provisioned key;
    in response to determining that the key has not been previously provisioned, enabling a key provisioning counter corresponding to the key and initializing a count value of the key provisioning counter to an initial value, and in response to determining that the key has been previously provisioned, updating the key provisioning counter that corresponds to the provisioned key;
    detecting a predetermined relationship between the total key provisions and the total number of operations; and
    providing an indication of the profiling attack in response to the relationship meeting a predetermined criterion.

11. The method of claim 10, further comprising:
    detecting a pattern between counter values corresponding to previously previsioned keys and counter values of operations using each previously provisioned key; and
    providing the indication of the profiling attack in response to detecting the pattern.

12. The method of claim 10, wherein the operations using the key are encryption operations.

13. The method of claim 10, wherein the provisioned keys are stored in a memory, wherein when a number of stored provisioned keys approaches a maximum storage capacity of the memory, keys are evicted from the memory using a predetermined key eviction strategy.

14. The method of claim 13, wherein a least recently used key is evicted when the maximum storage capacity is reached.

15. The method of claim 10, wherein the provisioned keys are stored in a memory, and wherein prior to storing, the provisioned keys are transformed using a predetermined algorithm.

16. The method of claim 15, wherein the predetermined algorithm is one of a hashing algorithm or a compression algorithm.

17. The method of claim 10, wherein detecting a predetermined relationship between the total key provisions and the total number of operations comprises determining a ratio of total key provisions to the total number of operations and comparing the ratio to a threshold.

18. The method of claim 10, wherein the key is one of either a cryptographic key, a pin code, or a password.

19. An electronic device comprising:
- a plurality of counters, each counter of the plurality of counters coupled to count usage of one assigned key of a plurality of keys;
- a total key operations counter coupled to count a total number of operations using the plurality of keys;
- a total key provisions counter coupled to count a total number of times a key is provisioned into the electronic device; and
- a key management circuit coupled to the plurality of counters, the total key operations counter, and the total key provisions counter, the key management circuit coupled to control the operations using the plurality of keys, wherein the key management circuit detects a profiling attack by comparing a predetermined relationship between selected counters of the plurality of counters, the total key operations counter, and the total key provisions counter.

20. The method of claim 19, wherein the key management circuit detects a predetermined relationship between a total key provisions counter value and a total key operations counter value and in response to the predetermined relationship meeting a predetermined criterion, providing an indication of a profiling attack.

* * * * *